June 20, 1933.  H. A. ROSELUND  1,914,730
HOSE CONNECTION
Filed July 29, 1932
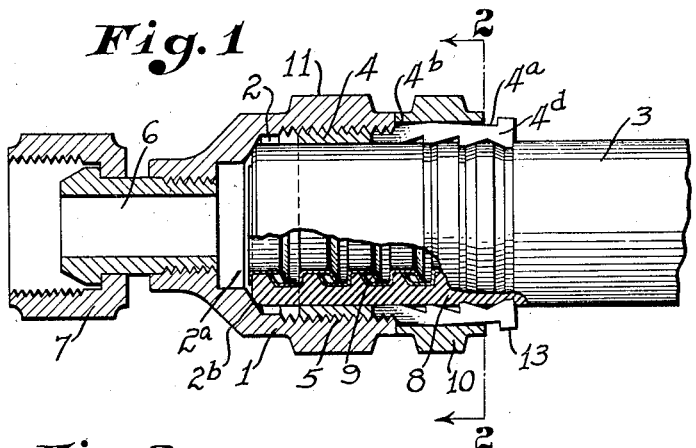
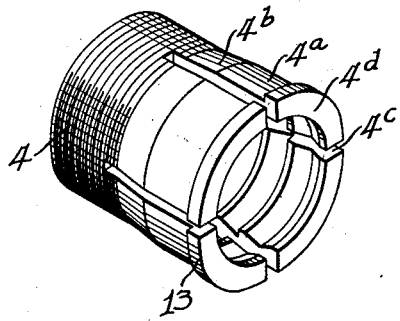
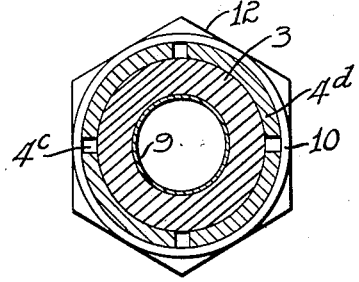
Inventor
Harold A. Roselund
By Owen & Owen
Attorneys Patented June 20, 1933

1,914,730

UNITED STATES PATENT OFFICE

HAROLD A. ROSELUND, OF TOLEDO, OHIO, ASSIGNOR TO THE DE VILBISS COMPANY, OF TOLEDO, OHIO, A CORPORATION OF OHIO

HOSE CONNECTION

Application filed July 29, 1932. Serial No. 625,773.

This invention relates to hose couplings, and particularly to such a coupling adapted for use in connection with fluid hose of the metal-lined type.

The object of the invention is the provision of an improved coupling of this character having a minimum number of parts and adapted to be easily, quickly and securely attached to a hose and to form one or more tight joints therewith.

The invention is fully described in the following specification, and while in its broader aspect it is capable of embodiment in numerous forms, a preferred embodiment thereof is illustrated in the accompanying drawing, in which—

Figure 1 is a central longitudinal section of a coupling embodying the invention attached to a hose with the latter partially shown in full. Fig. 2 is a cross-section on the line 2—2 in Fig. 1. Fig. 3 is a perspective view of the hose clamping member of the coupling.

Referring to the drawing, 1 designates the body shell of a coupling embodying the invention forming a cavity 2 for receiving an end of a hose 3 to which the coupling is to be attached, together with the clamping sleeve 4, which latter has its inner end adapted to be threaded into the shell socket, as shown at 5. The cavity 2 is provided with the reduced bottom portion 2ª and the annular shoulder 2ᵇ thus formed is tapered as shown.

A nipple 6 rigidly projects from the opposite end of the body shell 1 with its passage in coaxial communication with the socket 2 and adapted to have its outer end connected to a companion nipple or means, to which the hose 3 is to be connected, by a union nut 7, as is customary in couplings of this character. In the present instance, the nipple 6 is shown as being reduced in diameter with respect to the shell socket 2, but this is not essential, as the size of the nipple depends on the size of the part to which it is to be coupled by the nut 7.

The clamping sleeve 4 has a threaded portion adapted to thread in the socket 2 of the body shell and has a portion 4ª projecting from the portion 4 without the shell 1 and diametrically enlarged with the inner end of the enlarged portion connected by a taper 4ᵇ to the threaded reduced portion of the clamping sleeve. The extended portion 4ª is provided with a plurality of longitudinally extending slots 4ᵉ extending from or near the outer end thereof back through the tapered portion 4ᵇ and preferably a distance into the threaded portion 4 and dividing the outer end of the clamping sleeve with a plurality of compressible clamping portions 4ᵈ.

The inner bore of the sleeve 4 is substantially the same throughout its length and the contractible portion thereof formed by the clamping portions 4ᵈ is preferably internally serrated or formed with annular recesses, as shown at 8, to effect a firm gripping of the yielding outer surface material of a hose 3 when clamped therein. The hose is preferably of the metal-lined type, as shown at 9, so as to form a backing for the soft material of the hose when clamped by the sleeve 4.

A binding collar 10 of a diameter substantially the same as the external diameter of the threaded portion of the clamping sleeve 4 to adapt it to be loosely inserted thereover, and of an internal diameter less than the normal external diameter of the clamping portion 4ª of the sleeve is mounted on the threaded portion of the sleeve before being threaded into the shell 1, so that the continued threading of the sleeve into the shell will force the collar out on the inclined portion 4ᵇ to the enlarged portion 4ª of the sleeve, thus effecting a contraction or inward pressing of the clamping portions 4ᵈ into clamping engagement with the hose in opposition to the metal lining 9 thereof.

To facilitate a turning of the shell 1 relative to the sleeve 4 and collar 10, in frictional engagement therewith, the shell is provided with a hexagonal, or other suitable peripheral wrench engaging portion 11, and the collar 10 is provided with a similar portion 12.

By mounting the collar 10 separately on the sleeve 4 in advance of the shell 1, it is possible to grip the polygonal portion 12 of the collar between the jaws of a vise or wrench while the shell is turned to force the collar 10 onto the enlarged portion of the sleeve. Thus the wedging action of the tapered portion of the sleeve between the collar and the hose offers greater frictional resistance against rotation of the sleeve than is offered by the engagement of the shell with the sleeve and the face of the collar. There is no tendency, therefore, for the split portion of the sleeve to become distorted by twisting. The sleeve is drawn into the collar by a direct longitudinal movement.

On the other hand, if the collar 10 were integrally connected with the shell 1, it would be necessary to apply the jaws of the vise or fixed wrench directly to the end 13 of the sleeve, which would impose a twisting strain with maximum leverage upon the split portion of the sleeve, tending to distort it. Another objection to applying the vise to the end of the sleeve is that, as soon as the tapered portion begins to advance into the collar, it is compressed and slips out of the vise.

In the use of a coupling embodying the invention it is preferable to first insert an end of the hose 3 through the sleeve 4, with its end extending a short distance beyond the inner end of the sleeve, before threading the sleeve into the shell 1. The shell and sleeve are then relatively turned to effect a forcing of the contracting collar 10 up the incline 4$^b$ of the sleeve to effect a contraction of the hose gripping portion of the sleeve. This threading action also causes the end of the hose to have contact with the taper 2$^b$ at the bottom of the shell to effect a close joint at such point between the shell and hose. The reduced portion 2$^a$ of the shell cavity is of greater diameter than the metal backing portion 9 of the hose, so that such portion at its end may project therein during the end-seating operation of the hose.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. A coupling of the class described comprising a clamping sleeve adapted to receive a hose and having one end threaded and its opposite end portion contractible and externally enlarged and provided with a taper leading therefrom to the threaded portion, a shell having a passage therethrough and adapted to have the threaded end of the clamping sleeve threaded therein, means separately mounted on the sleeve in advance of the shell and adapted to be urged over said taper and onto the enlarged portion of the sleeve to effect a hose clamping contraction of the enlarged end of the sleeve, and means for connecting the opposite end of the shell to a tubular member.

2. A hose coupling comprising a clamping sleeve adapted to receive the end of a hose and having one end threaded and its opposite end portion contractible and externally enlarged and provided with a taper leading therefrom to the threaded portion, a shell having internal threads to engage the threads of said sleeve, and a collar mounted on the sleeve in advance of the shell and adapted to be urged over said taper onto the enlarged portion of the sleeve by a relative turning of the shell and collar to effect a hose clamping contraction of the enlarged end of the sleeve, said shell and collar being each provided with a peripheral surface adapted to be gripped by a wrench or vise.

In testimony whereof I have hereunto signed my name to this specification.

HAROLD A. ROSELUND.